(12) United States Patent
Cimarusti et al.

(10) Patent No.: US 12,503,449 B2
(45) Date of Patent: Dec. 23, 2025

(54) METHODS OF PREPARING CHIRAL BENZODIAZEPINONE DERIVATIVES

(71) Applicant: Immunome, Inc., Bothell, WA (US)

(72) Inventors: Christopher M. Cimarusti, Clementon, NJ (US); Anandkumar Madanlal Lahoti, Hyderabad (IN); Madan Raja Gopal Reddy Daram, Ambapuram (IN)

(73) Assignee: Immunome, Inc., Bothell, WA (US)

( * ) Notice: Subject to any disclaimer, the term of this patent is extended or adjusted under 35 U.S.C. 154(b) by 399 days.

(21) Appl. No.: 17/799,680

(22) PCT Filed: Feb. 16, 2021

(86) PCT No.: PCT/US2021/018137
§ 371 (c)(1),
(2) Date: Aug. 14, 2022

(87) PCT Pub. No.: WO2021/163676
PCT Pub. Date: Aug. 19, 2021

(65) Prior Publication Data
US 2023/0108536 A1 Apr. 6, 2023

Related U.S. Application Data

(60) Provisional application No. 62/977,316, filed on Feb. 16, 2020.

(51) Int. Cl.
*C07D 207/28* (2006.01)
*C07D 243/24* (2006.01)
(Continued)

(52) U.S. Cl.
CPC ......... *C07D 243/26* (2013.01); *C07D 243/24* (2013.01)

(58) Field of Classification Search
CPC .. C07D 243/24; C07D 243/26; C07D 243/30; C07D 207/28
See application file for complete search history.

(56) References Cited

U.S. PATENT DOCUMENTS 9,133,139 B2 * 9/2015 Gavai ................ C07D 491/056
9,273,014 B2 3/2016 Gavai et al.

FOREIGN PATENT DOCUMENTS

CN 106660949 A 5/2017
CN 105439939 A 12/2018
(Continued)

OTHER PUBLICATIONS

Gualtieri, F. (ed.) (2000). New trends in synthetic medicinal chemistry. Chapter 6: Resolution of Enantiomers of Chiral Drugs, Wiley-VCH Verlag, 142-143.
(Continued)

*Primary Examiner* — Brenda L Coleman
(74) *Attorney, Agent, or Firm* — Antheros Legal Advisors LLP

(57) ABSTRACT

The present invention provides methods of preparing compound of Formula (I), wherein the compounds are represented by the structure of Formula (I) wherein: $R^1$ each is independently F, Cl, Br, I, $OCH_3$, CN or $NO_2$; $R^2$ each is independently identical or different $C_1$-$C_5$ alkyl; $n^1$ is an integer between 1 and 5; and $n^2$ is an integer between 1 and 4. In addition, the present invention provides a compound represented by the following structures: Compound (1a) and Compound (2), wherein X comprises: chloride, acetate, adipate, alginate, ascorbate, aspartate, benzoate, benzenesulfonate, bisulfate, borate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt, or any combination thereof.

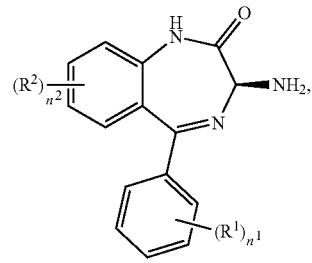

Formula (I)

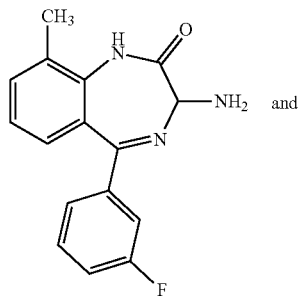

Compound (1a)

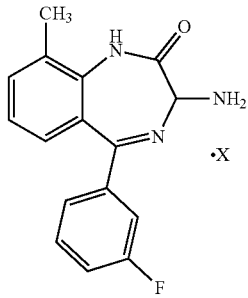

Compound (2)

21 Claims, 1 Drawing Sheet

(51) Int. Cl.
*C07D 243/26* (2006.01)
*C07D 243/30* (2006.01)

(56) References Cited

FOREIGN PATENT DOCUMENTS

| | | |
|---|---|---|
| EP | 3162793 A1 | 4/2019 |
| JP | H05178808 A | 7/1993 |
| WO | WO-2010073253 A1 | 7/2010 |
| WO | WO-2014047372 A1 | 3/2014 |
| WO | WO-2014047374 A1 | 3/2014 |
| WO | WO-2014047392 A1 | 3/2014 |
| WO | WO-2014047397 A1 | 3/2014 |

OTHER PUBLICATIONS

International Search Report and the Written Opinion of the International Searching Authority dated Jun. 1, 2021, issued in the corresponding PCT International Application No. PCT/US2021/018137, dated Feb. 16, 2021.
Preliminary Report On Patentability (Chapter I of the PCT) dated Aug. 25, 2022, issued in the corresponding PCT International Application No. PCT/US2021/018137, dated Feb. 16, 2021.
Vairaprakash, P. et al. (2008). Efficient resolution of (±)-trans-2,3-diphenylpiperazine using (1 S)-(+)-10-camphorsulfonic acid and enrichment of enantiomeric purity of non-racemic 2,3-diphenylpiperazine using different achiral acids. *Journal of Chemical Sciences*, 120, 175-179.
Handbook of Chemistry, Applied Chemistry, 5th edition, 2nd printing, 2001, pp. II-320 to II-322.

\* cited by examiner

METHODS OF PREPARING CHIRAL BENZODIAZEPINONE DERIVATIVES

CROSS-REFERENCE TO RELATED APPLICATIONS

This application is a National Phase Application of PCT International Application No. PCT/US2021/018137, International Filing Date Feb. 16, 2021, claiming the benefit of U.S. Patent Application No. 62/977,316, filed Feb. 16, 2020, which are hereby incorporated by reference herein in their entirety.

FIELD OF THE INVENTION

The present invention provides methods of preparing compound of Formula (I), as well as other compounds derived therefrom, wherein the compounds are represented by the structure of Formula (I):

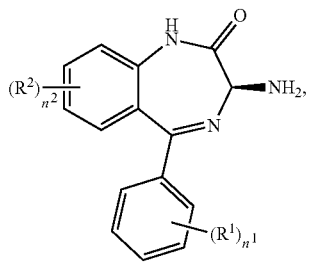

Formula (I)

wherein:

$R^1$ each is independently F, Cl, Br, I, $OCH_3$, CN or $NO_2$;

$R^2$ each is independently identical or different $C_1$-$C_5$ alkyl;

$n^1$ is an integer between 1 and 5; and $n^2$ is an integer between 1 and 4.

In addition, the present invention provides a compound represented by the following structure:

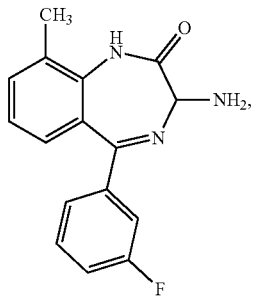

Compound (1a)

its pharmaceutically acceptable salts, or a combination thereof.

In addition, the present invention provides a compound represented by the following structure:

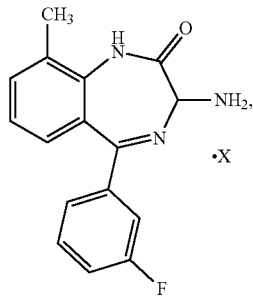

Compound (2)

wherein X comprises:

chloride, acetate, adipate, alginate, ascorbate, aspartate, benzoate, benzenesulfonate, bisulfate, borate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt, or any combination thereof.

BACKGROUND OF THE INVENTION

Benzodiazepinone compounds are useful as pharmaceutically active ingredients in the pharmaceutical and fine chemical industries. For example, the gamma-secretase inhibitor (GSI) (2R,3S)-N-[(3S)-5-(3-Fluorophenyl)-9-methyl-2-oxo-2,3-dihydro-1H-1,4-benzodiazepin-3-yl]-2,3-bis(3,3,3-trifluoropropyl) succinimide:

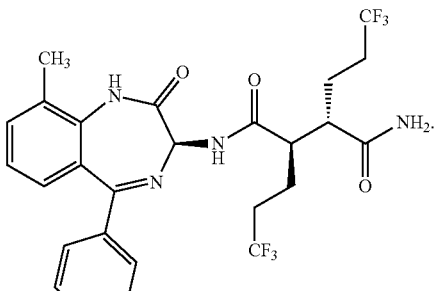

is showing promising results in current clinical trials for the treatment of various cancers, particularly cancers with defects in Notch regulation (see U.S. Pat. No. 9,273,014, incorporated herein by reference).

Since (2R,3S)-N-[(3S)-5-(3-Fluorophenyl)-9-methyl-2-oxo-2,3-dihydro-1H-1,4-benzodiazepin-3-yl]-2,3-bis(3,3,3-trifluoropropyl) succinimide is chiral, an efficient and diastereoselective preparation of the chiral compound in a pure form is needed.

U.S. Pat. No. 9,273,014 discloses a precursor to (2R,3S)-N-[(3S)-5-(3-Fluorophenyl)-9-methyl-2-oxo-2,3-dihydro-1H-1,4-benzodiazepin-3-yl]-2,3-bis(3,3,3-trifluoropropyl)succinimide, which is a compound represented by the following structure:

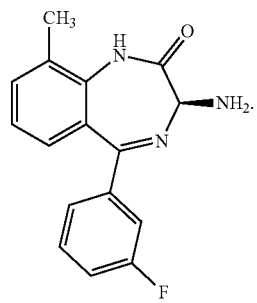

Compound (1)

In U.S. Pat. No. 9,273,014, Compound (1) is prepared as described in Scheme 1 below. In brief, Compound (a) is resolved using chiral Supercritical Fluid Chromatography (SFC) to form chiral Compound (b); which is then hydrolyzed to produce Compound (1). However, chiral chromatographic methods, such as SFC and High-Performance Liquid Chromatography (HPLC), are expensive, time-consuming and tedious methods of producing chiral compounds. In addition, these methods have a theoretical yield of only 50%.

Scheme 1: Preparation of Compound (3) using chiral SFC conditions.

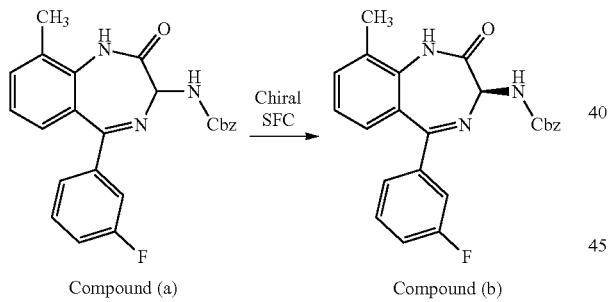

Compound (a)        Compound (b)

↓ HBr/HOAc

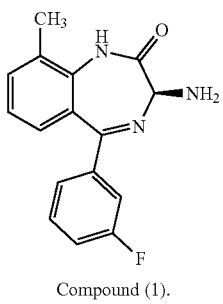

Compound (1).

SUMMARY OF THE INVENTION

In one embodiment, the present invention provides a method of preparing the compound of Formula (Ib),

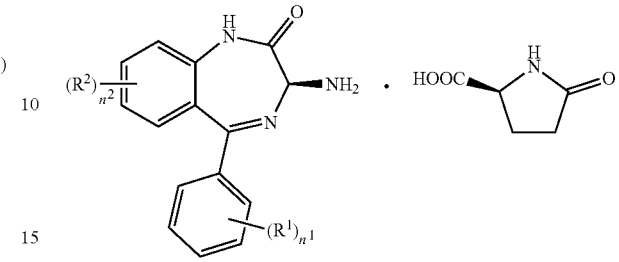

Formula (Ib)

wherein:
R$^1$ each is independently Cl, F, Br, I, OCH$_3$, CN or NO$_2$;
R$^2$ each is independently identical or different C$_1$-C$_5$ alkyl;
n$^1$ is an integer between 1 and 5; and
n$^2$ is an integer between 1 and 4;
comprising the step of reacting the compound of Formula (Ia)

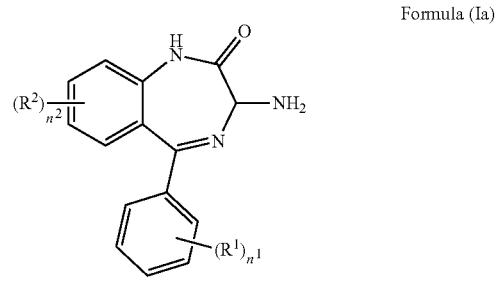

Formula (Ia)

with L-pyroglutamic acid (L-PGA),

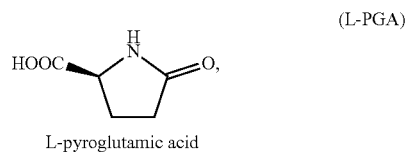

(L-PGA)

L-pyroglutamic acid in the presence of solvent with or without catalyst to obtain a compound of Formula (Ib).

In another embodiment, the present invention provides a method of preparing the compound of Formula (Id),

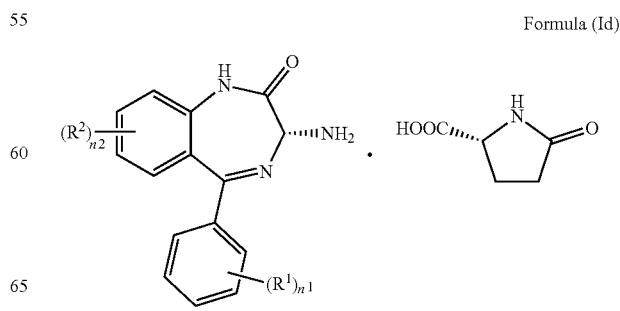

Formula (Id)

wherein
R¹ each is independently Cl, F, Br, I, OCH₃, CN or NO₂;
R² each is independently identical or different C₁-C₅ alkyl;
n¹ is an integer between 1 and 5; and
n² is an integer between 1 and 4;
comprising the step of reacting the compound of Formula (Ia)

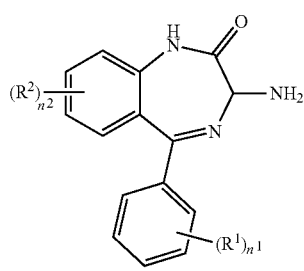

Formula (Ia)

with D-pyroglutamic acid (D-PGA),

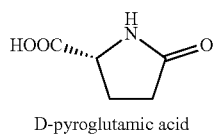

(D-PGA)

D-pyroglutamic acid in the presence of solvent and with or without catalyst to obtain a compound of Formula (Ib).

In another embodiment, the present invention provides a method of preparing the compound of Formula (Ic),

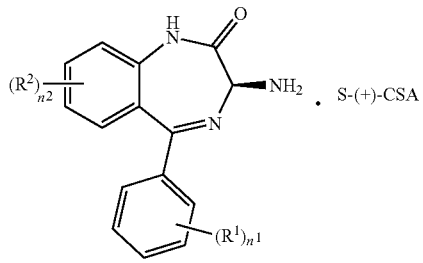

Formula (Ic)

comprising the steps of:
a) reacting the compound of Formula (Ib):

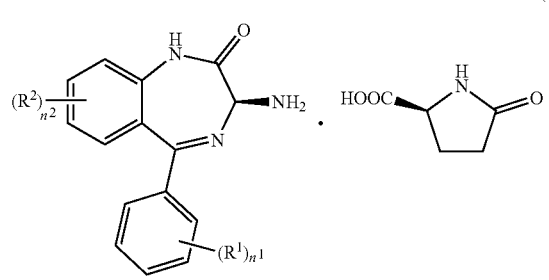

Formula (Ib)

with a base and solvent to provide a compound of Formula (I); and

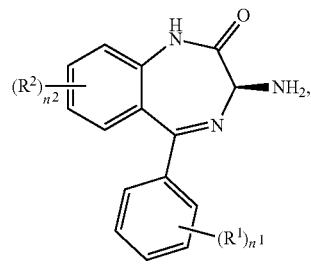

Formula (I)

b) reacting the compound of Formula (I) with S (+) camphor sulfonic acid (CSA):

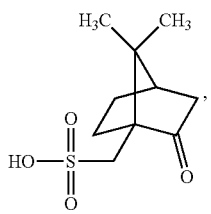

to provide a compound of Formula (Ic),
wherein
R¹ each is independently Cl, F, Br, I, OCH₃, CN or NO₂;
R² each is independently identical or different C₁-C₈alkyl;
n¹ is an integer between 1 and 5; and
n² is an integer between 1 and 4.

In another embodiment, the present invention provides a compound represented by the following structure:

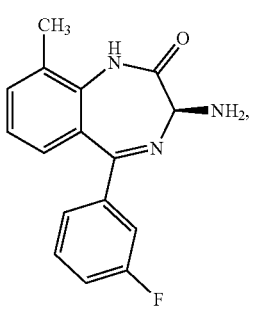

Compound (1a)

its pharmaceutically acceptable salts, or a combination thereof wherein the salt comprises chloride, acetate, adipate, alginate, ascorbate, aspartate, benzoate, benzenesulfonate, bisulfate, borate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate or undecanoate salt or any combination thereof.

In another embodiment, the present invention provides a compound represented by the following structure:

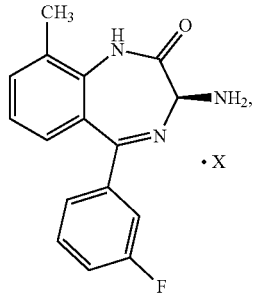

Compound (2)

wherein X comprises: chloride, acetate, adipate, alginate, ascorbate, aspartate, benzoate, benzenesulfonate, bisulfate, borate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt, or any combination thereof.

DETAILED DESCRIPTION OF THE PRESENT INVENTION

Figure 1:
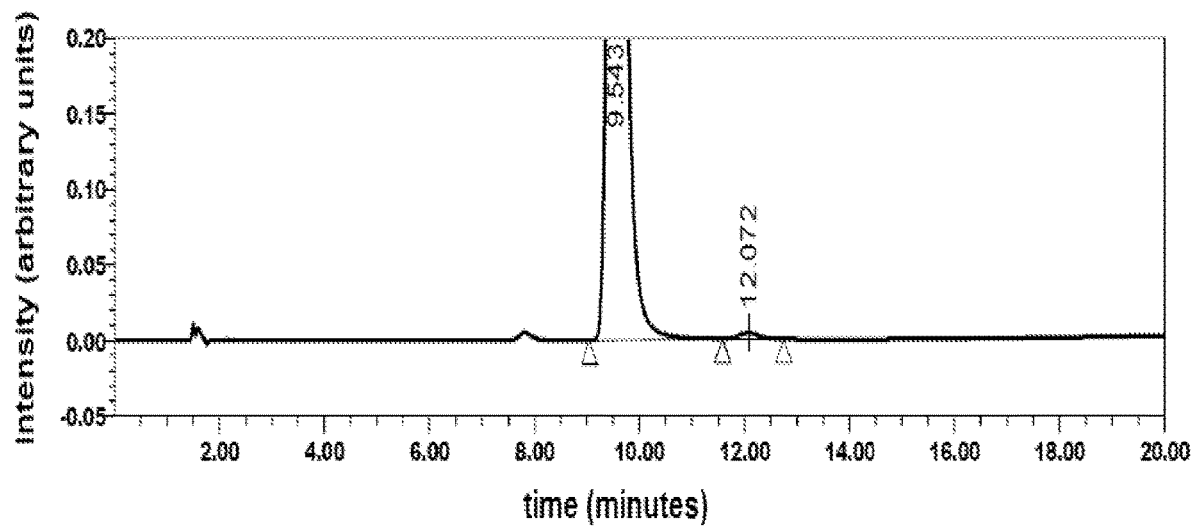
FIG. 1 depicts an HPLC chromatogram, showing the chiral purity of Compound (1b).

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method of Preparing Compounds of Formula (I) and Salts thereof

In one embodiment, the present invention provides a method of preparing a compound of Formula (Iz), comprising the step of reacting a compound of Formula (Ia):

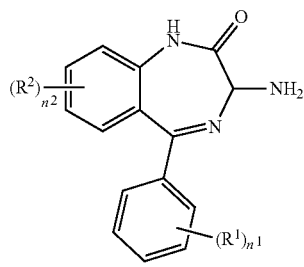

Formula (Ia)

with $X^1$ to provide a compound of Formula (Iz):

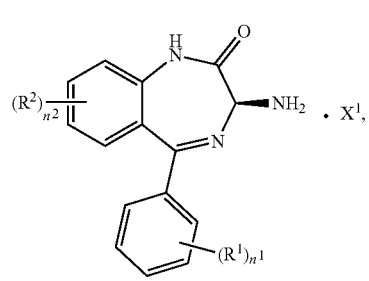

Formula (Iz)

wherein $X^1$ is a chiral salt;

$R^1$ each is independently F, Cl, Br, I, $OCH_3$, CN or $NO_2$;

$R^2$ each is independently identical or different $C_1$-$C_5$ alkyl;

$n^1$ is an integer between 1 and 5; and $n^2$ is an integer between 1 and 4.

In one embodiment, the chiral salt comprises L-pyroglutamic acid (L-PGA), L-Aspartic acid, L-Leucine, S-Mandelic acid, N-Acetyl-L-Tyrosine, N-Acetyl-L-Valine, S(+) CSA (camphor sulfonic acid) and L-Glutamic acid. Each possibility represents a separate embodiment of the invention.

In another embodiment, the present invention provides a method of preparing a compound of Formula (Ib), comprising the step of reacting a compound of Formula (Ia):

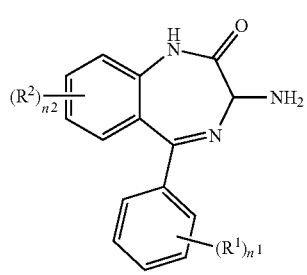

Formula (Ia)

with

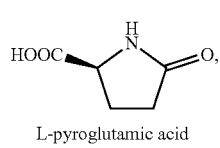

(L-PGA)

L-pyroglutamic acid to provide a compound of Formula (Ib):

Formula (Ib)

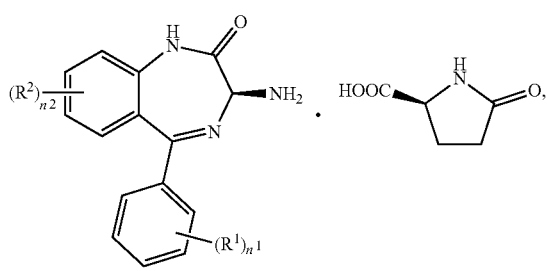

wherein
R[1] each is independently F, Cl, Br, I, OCH$_3$, CN or NO$_2$;
R[2] each is independently identical or different C$_1$-C$_5$ alkyl;
n[1] is an integer between 1 and 5; and
n[2] is an integer between 1 and 4.

Each possibility represents a separate embodiment of the invention.

In one embodiment, the compounds of Formulas (Iz), (Ia) and (Ib) are represented by the compounds of Formulas (Iz-1), (Ia-1) and (Ib-1), respectively:

Formula (Iz-1)

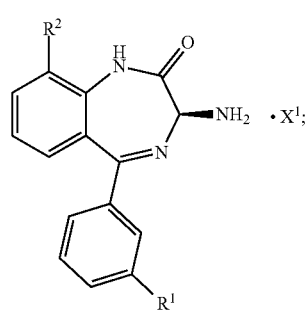

Formula (Ia-1)

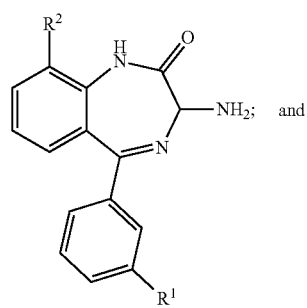

Formula (Ib-1)

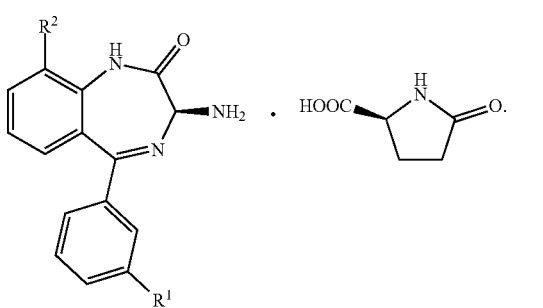

Each possibility represents a separate embodiment of the invention.

In another embodiment, the compounds of Formulas (Iz), (Ia) and (Ib) are represented by Compounds (1z), (1a) and (1b), respectively, having the following structures:

Compound (1z)

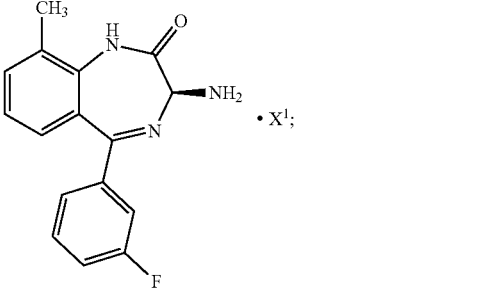

Compound (1a)

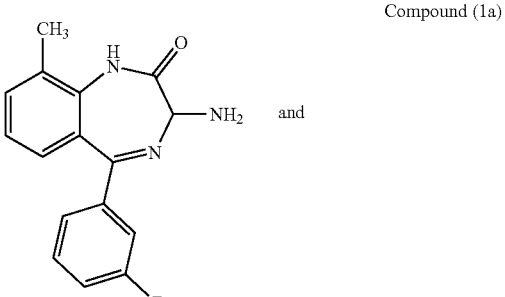

Compound (1b)

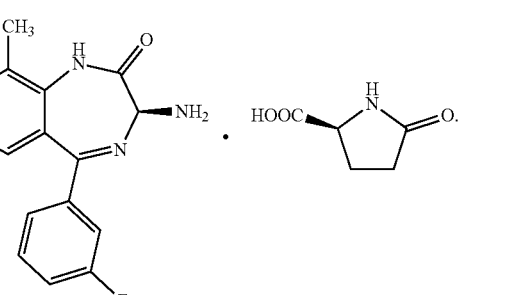

Each possibility represents a separate embodiment of the invention.

In another embodiment, the present invention provides a method of preparing a compound of Formula (I), (I-1) or Compound (1), comprising the step of reacting said compound of Formula (Iz), (Iz-1) or (1z):

Formula (Iz)

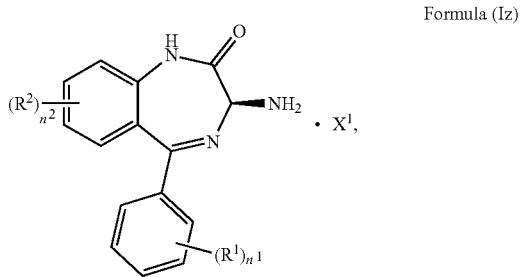

-continued

Formula (Iz-1)

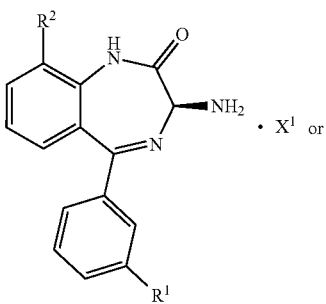 · X¹ or

Compound (1z)

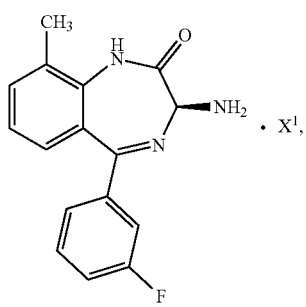 · X¹, with a base to provide a compound of Formula (I), (I-1) or Compound (1), respectively:

Formula (I)

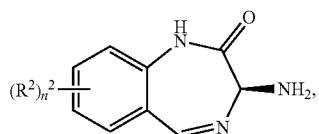

Formula (I-1)

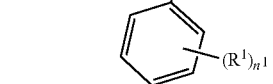 or

Compound (1)

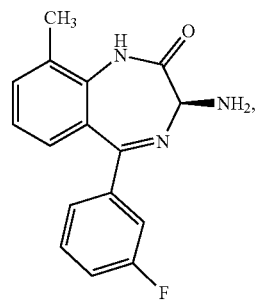

wherein
- $X^1$ is selected from L-pyroglutamic acid (L-PGA), L-Aspartic acid, L-Leucine, S-Mandelic acid, N-Acetyl-L-Tyrosine, N-Acetyl-L-Valine, S(+) CSA (camphor sulfonic acid) and L-Glutamic acid;
- $R^1$ each is independently F, Cl, Br, I, OCH$_3$, CN or NO$_2$;
- $R^2$ each is independently identical or different $C_1$-$C_5$ alkyl;
- $n^1$ is an integer between 1 and 5; and
- $n^2$ is an integer between 1 and 4.

Each possibility represents a separate embodiment of the invention.

In another embodiment, the present invention provides a method of preparing a compound of Formula (I), (I-1) or Compound (1), comprising the step of reacting said compound of Formula (Ib), (Ib-1) or (1b):

Formula (Ib)

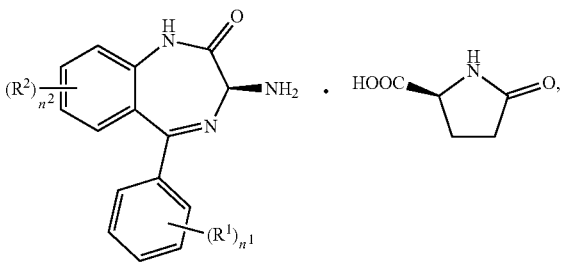

Formula (Ib-1)

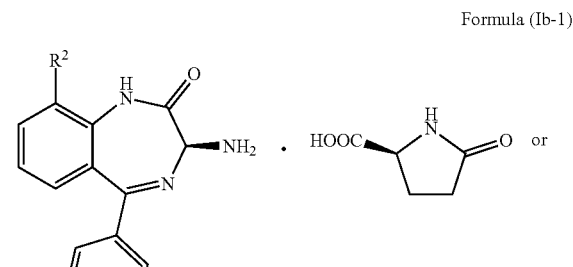 or

Compound (1b)

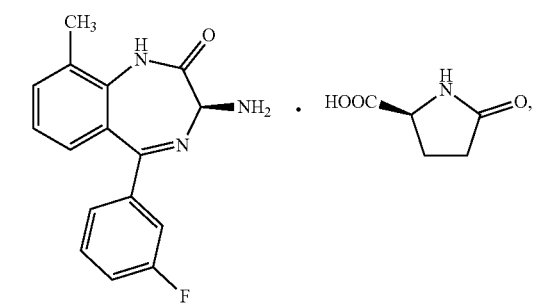

with a base to provide a compound of Formula (I), (I-1) or Compound (1), respectively:

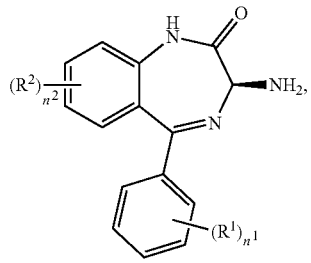
Formula (I)

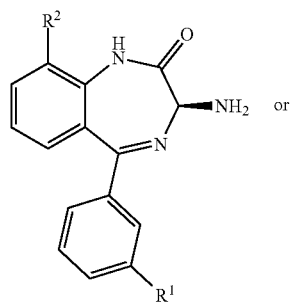
Formula (I-1)

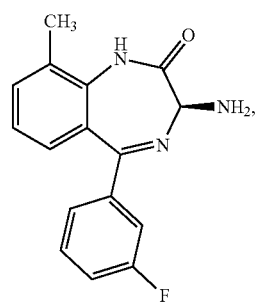
Compound (1)

wherein
R¹ each is independently F, Cl, Br, I, OCH₃, CN or NO₂;
R² each is independently identical or different $C_1$-$C_5$ alkyl;
n¹ is an integer between 1 and 5; and
n² is an integer between 1 and 4.

Each possibility represents a separate embodiment of the invention.

In another embodiment, the method further comprises the step of converting the free-base compound of Formula (I), (I-1) or Compound (1) to its pharmaceutically acceptable salt via e.g. addition of the respective acid, for example hydrochloric acid to this compound to get the chloride salt. In another embodiment, the salt is chloride, acetate, adipate, alginate, ascorbate, aspartate, benzoate, benzenesulfonate, bisulfate, borate, butyrate, citrate, camphorate, pyroglutamate, camphorsulfonate, cyclopentanepropionate, digluconate, dodecylsulfate, ethanesulfonate, fumarate, glucoheptanoate, glycerophosphate, hemisulfate, heptanoate, hexanoate, hydrochloride, hydrobromide, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt, or any combination thereof. Each possibility represents a separate embodiment of the invention.

Surprisingly, L-PGA was the most successful of the chiral acids of X¹ in the resolution of racemic Compound (1a) and provision of a pure Compound (1). In another embodiment, the CSA (camphor sulfonic acid) salt of the S(+) enantiomer of Formula (Ia), (Ia-1) or Compound (1a) (represented by Formula (Ic), (Ic-1a) or Compound (1c); see below) was formed upon reacting the compound represented by Formula (Ib), (Ib-1) or Compound (1b) (structures as provided hereinabove) with base, followed by reaction with S(+) CSA. The formed S(+) CSA salt (represented by the structures of Formula (Ic), (Ic-1) or Compound (1c)) was obtained in high chiral purities, of above 99%, above 99.1%, above 99.2%, above 99.3%, above 99.4%, above 99.5%, above 99.6% or above 99.7%. In one embodiment, the chiral purity of the CSA salts (represented by e.g. Formula (Ic)) is higher than the chiral purity of the PGA salts (represented by e.g. Formula (Ib)). In another embodiment, the chiral purity of the CSA salts is lower, similar or equal to the chiral purity of the PGA salts. Each possibility represents a separate embodiment of the invention.

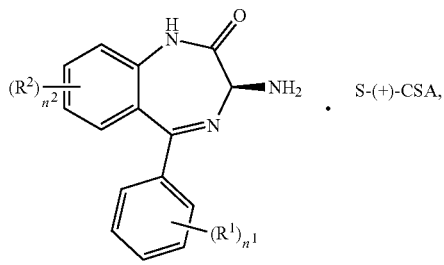
Formula (Ic)

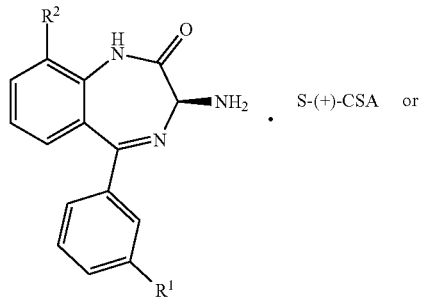
Formula (Ic-1)

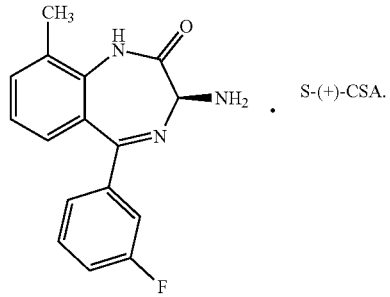
Compound (1c)

In another embodiment, the present invention provides a method of preparing a compound of Formula (Ic), (Ic-1) or Compound (1c), comprising the steps of:

a) reacting said compound of Formula (Ib), (Ib-1) or (1b):

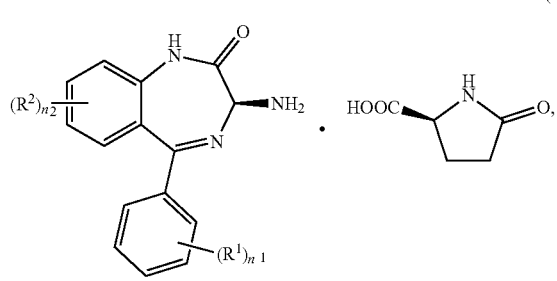

Formula (Ib)

Formula (Ib-1)

Compound (1b)

with a base to provide a compound of Formula (I), (I-1) or Compound (1), respectively:

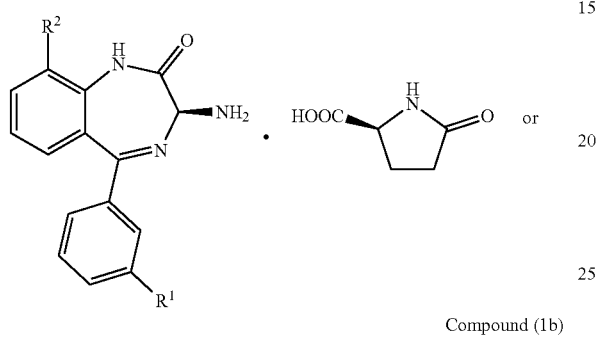

Formula (I)

Formula (I-1)

Compound (1)

b) reacting S (+) CSA:
with the compound of Formula (I), (I-1) or Compound (1), to provide a compound of Formula (Ic), (Ic-1) or Compound (1c), respectively:

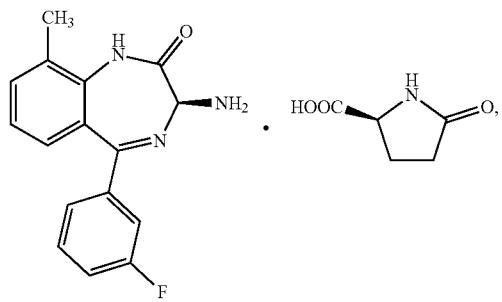

Formula (Ic)

Formula (Ic-1)

Compound (1c)

wherein
R¹ each is independently F, Cl, Br, I, OCH₃, CN or NO₂;

R² each is independently identical or different $C_1$-$C_5$ alkyl;
$n^1$ is an integer between 1 and 5; and
$n^2$ is an integer between 1 and 4.

Each possibility represents a separate embodiment of the invention.

In another embodiment, the present invention provides a method of preparing a compound of Formula (I), (I-1) or Compound (1), comprising the step of reacting said compound of Formula (Ic), (Ic-1) or Compound (1c) with a base as described hereinabove for the method with Formula (Ib), (Ib-1) or Compound (1b).

In this regard, it should be noted that reaction of the racemic compound (represented by the structure of Formula (Ia), Formula (Ia-1) or Compound (1a)) with the chiral CSA in the methods of the present invention does not lead to resolution of the racemic compound. Instead, chiral CSA is replacing the chiral PGA within the chiral salt (the compound represented by Formula (Ib), (Ib-1) or Compound (1b)), via in-situ formation of chiral amine free-base.

In some embodiments, reacting the compound represented by Formula (Ia), (Ia-1) or Compound (1a) with the acid with the inverse chirality (e.g. D-PGA instead of L-PGA) in the method according to the invention as described hereinabove leads to the formation of the enantiomeric salt of the compound represented by Formula (Ib), (Ib-1) or Compound (1b). This compound is represented by the structure of Formula (Izi), (Izi-1a) or Compound (1zi):

Formula (Izi)

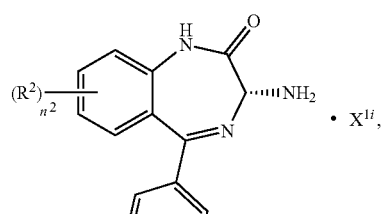

Formula (Izi-1)

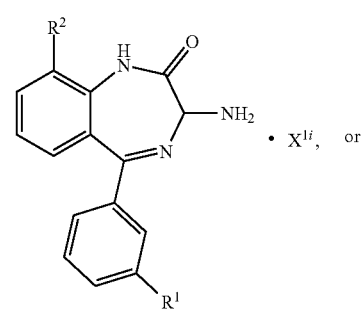

Compound (1zi)

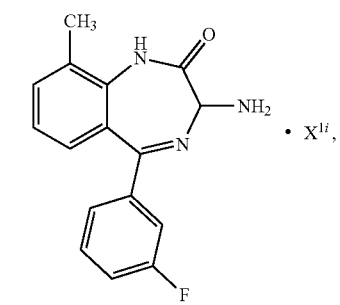

wherein
Xli is selected from D-pyroglutamic acid (D-PGA), D-Aspartic acid, D-Leucine, R-Mandelic acid, N-Acetyl-D-Tyrosine, N-Acetyl-D-Valine, R(−) CSA (camphor sulfonic acid) and D-Glutamic acid;
$R^1$ each is independently F, Cl, Br, I, $OCH_3$, CN or $NO_2$;
$R^2$ each is independently identical or different $C_1$-$C_5$ alkyl;
$n^1$ is an integer between 1 and 5; and
$n^2$ is an integer between 1 and 4.

Each possibility represents a separate embodiment of the invention.

In some embodiments, reacting the compound represented by Formula (Ia), (Ia-1) or Compound (1a) with D-PGA instead of L-PGA in the method according to the invention as described hereinabove leads to the formation of the enantiomeric salt of the compound represented by Formula (Ib), (Ib-1) or Compound (1b). This compound is represented by the structure of Formula (Id), (Id-1a) or Compound (1d):

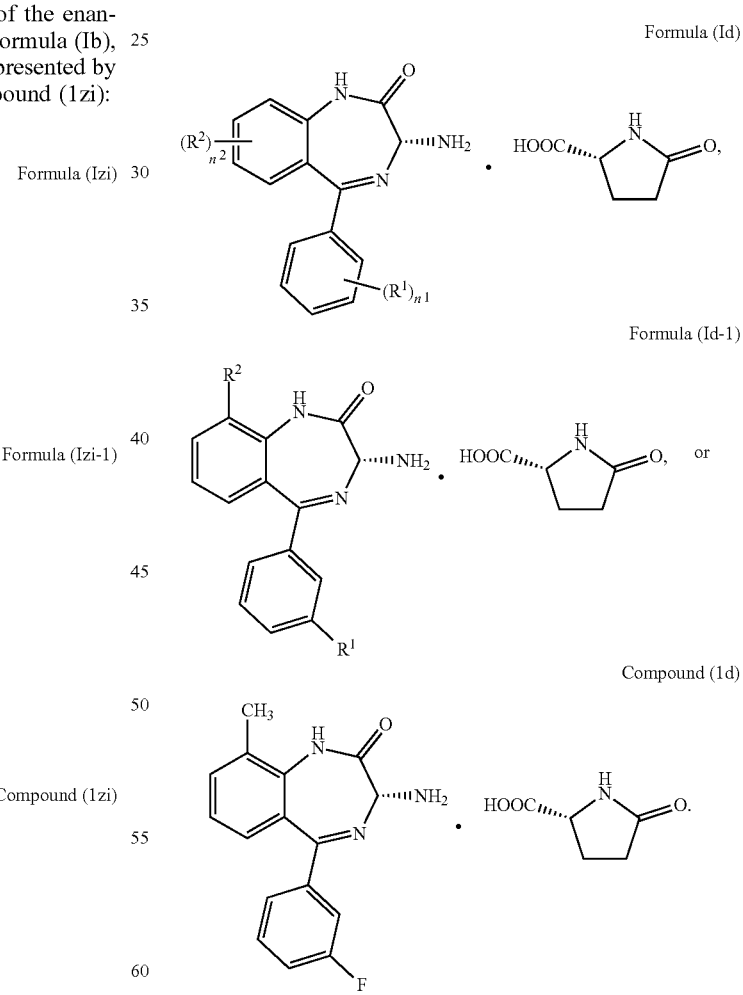

Each possibility represents a separate embodiment of the invention.

In some embodiments, the methods of preparing the compound of Formula (Iz), (Izi), (Iz-1), (Izi-1) or Compound (1z) or (1zi) further comprise a step of adding an anti-solvent to the reaction mixture, following quenching of the reaction; and reacting this mixture with the anti-solvent, where Formula (Iz), (Izi), (Iz-1), (Izi-1) or Compound (1z) or (1zi) are as defined hereinabove. In one embodiment, the methods comprise the steps of:

a. reacting a compound of Formula (Ia), (Ia-1) or Compound (1a) with $X^1$ or Xli to provide a compound of Formula (Iz), (Izi), (Iz-1), (Izi-1) or Compound (1z) or (1zi);
b. quenching the reaction of step (a);
c. adding an anti-solvent to the reaction mixture of step (b); and
d. reacting the mixture of step (b) with the anti-solvent, wherein Formulas (Ia), (Ia-1), (Iz), (Izi), (Iz-1), (Izi-1) and Compounds (1a), (1z) and (1zi) are as defined hereinabove.

In some embodiments, the methods of preparing the compound of Formula (Ib), (Ib-1) or Compound (1b) further comprise a step of adding an anti-solvent to the reaction mixture, following quenching of the reaction; and reacting this mixture with the anti-solvent, where Formulas (Ib), (Ib-1) and Compound (1b) are as defined hereinabove. In one embodiment, the methods comprise the steps of:

a. reacting a compound of Formula (Ia), (Ia-1) or Compound (1a) with L-pyroglutamic acid (L-PGA) to provide a compound of Formula (Ib), (Ib-1) or Compound (1b);
b. quenching the reaction of step (a);
c. adding an anti-solvent to the reaction mixture of step (b); and
d. reacting the mixture of step (b) with the anti-solvent, wherein Formulas (Ia), (Ia-1), (Ib), (Ib-1), and Compounds (1a) and (1b) are as defined hereinabove.

In some embodiments, the methods of preparing the compound of Formula (Iz), (Izi), (Iz-1), (Izi-1) or Compound (1z) or (1zi) further comprise the step of adding an anti-solvent and a catalyst to the reaction mixture and reacting the mixture with the anti-solvent and the catalyst, where Formula (Iz), (Izi), (Iz-1), (Izi-1) or Compound (1z) or (1zi) are as defined hereinabove. In one embodiment, the methods comprise the steps of:

a. reacting a compound of Formula (Ia), (Ia-1) and Compound (1a) with $X^1$ or Xli for a period of time, to provide a compound of Formula (Iz), (Izi), (Iz-1), (Izi-1) or Compound (1z) or (1zi);
b. adding a catalyst to the reaction mixture of step (a) and reacting the reaction mixture of step (a) with the catalyst for additional period of time;
c. quenching the reaction of step (b);
d. adding an anti-solvent to the reaction mixture of step (c); and
e. reacting the mixture of step (c) with the anti-solvent, where Formulas (Ia), (Ia-1), (Iz), (Izi), (Iz-1), (Izi-1) and Compounds (1a), (1z) and (1zi) are as defined hereinabove.

In some embodiments, the methods of preparing the compound of Formula (Ib), (Ib-1) and Compound (1b) further comprise the step of adding an anti-solvent and a catalyst to the reaction mixture and reacting the mixture with the anti-solvent and the catalyst, where Formulas (Ib), (Ib-1) and Compound (1b) are as defined hereinabove. In one embodiment, the methods comprise the steps of:

a. reacting a compound of Formula (Ia), (Ia-1) and Compound (1a) with L-pyroglutamic acid (L-PGA) for a period of time, to provide a compound of Formula (Ib), (Ib-1) and Compound (1b);
b. adding a catalyst to the reaction mixture of step (a) and reacting the reaction mixture of step (a) with the catalyst for additional period of time;
c. quenching the reaction of step (b);
d. adding an anti-solvent to the reaction mixture of step (c); and
e. reacting the mixture of step (c) with the anti-solvent, where Formulas (Ia), (Ia-1), (Ib), (Ib-1), and Compounds (1a) and (1b) are as defined hereinabove.

In one embodiment, the anti-solvent is cyclohexane, heptane, hexane or petroleum ether. In one embodiment, the quenching is done via cooling to 25-35° C. Each possibility represents a separate embodiment of the invention.

In one embodiment, the yield of the desired chiral salt (e.g. compound of Formula (Iz), (Ib), (Id) or (Izi), Compound (1z), (1b), (1d), or (1zi)) is less than 50%. In one further embodiment, the yield of the desired chiral salt (e.g. compound of Formula (Iz), (Ib), (Id) or (Izi), Compound (1z), (1b), (1d), or (1zi)) is more than 50%. In another embodiment, the yield is more than 55%. In another embodiment, the yield is more than 60%. In another embodiment, the yield is more than 65%. In another embodiment, the yield is more than 70%. In another embodiment, the yield is more than 75%. In another embodiment, the yield is more than 80%. In another embodiment, the yield is more than 85%. In another embodiment, the yield is more than 90%. In another embodiment, the yield is more than 95%. In another embodiment, the yield is more than 99%. In some embodiments, when the yield of the desired chiral salt (e.g. compound of Formula (Iz), (Ib), (Id), or (Izi), Compound (1z), (1b), (1d), or (1zi)) is less than 50%, the reaction is said to proceed by a chiral resolution mechanism. Chiral resolution is found (e.g. Dale, J. A. et al. *J. Org. Chem.* 1969, 34 (9): 2543-2549) when e.g. a racemic mixture is reacted with a chiral acid/base to provide a chiral salt in a maximum of 50% yield from the initial racemic mixture (one stereisomer of the chiral salt precipitate in the solution and the other one, of the other enantiomer within the racemate, dissolves within or does not form at all). In some embodiments, when the yield of the desired chiral salt (e.g. compound of Formula (Iz), (Ib), (Id) or (Iz), Compound (1z), (1b), (1d), or (1zi)) is more than 50%, the reaction is via dynamic kinetic resolution (DKR) (Pellisier et al. Tetrahedron 2003, 59, 8291-8327). With DKR, when a racemic mixture is reacted with a chiral acid/base to provide a chiral salt, and the yield is higher than 50%, at least part of the opposite, non-desired enantiomer (within the racemic mixture), is dynamically converted (i.e. epimerized) into the desired enantiomer during the process. In one embodiment, DKR occurs in the absence of a catalyst. In another embodiment, DKR occurs in the presence of a catalyst. In one embodiment, the catalyst is an aldehyde catalyst. In another embodiment, the catalyst is benzaldehyde, salicylaldehyde, 3,5-dichlorosalicylaldehide or p-nitrobenzaldehyde. Each possibility represents a separate embodiment of the invention.

In another embodiment, the period of time and the additional period of time of steps (a) and (b), respectively, are each independently between 0.5 and 48 hours. In another embodiment, the period or additional period of time is 1-3, 3-5, 5-10, 10-24 or 24-48 hours. Each possibility represents a separate embodiment of the invention.

In one embodiment, Example 2 provides one method for preparing Compound (1).

In some embodiments, the methods as described herein produce a chiral compound or salt of e.g. Formula (I), (Ib), (Iz), (Ic), (Id), or (Izi) with a chiral purity of greater than 99%. In another embodiment, the chiral purity is above 99.4%. In another embodiment, the chiral purity is above 99.5%. Each possibility represents a separate embodiment of the invention.

In some embodiments, the base used within the methods of the present invention comprises an inorganic or organic base or any combination thereof. In one embodiment, the inorganic base comprises: an alkali metal hydroxide, an alkali metal hydride, an alkali metal alkoxide, an alkali metal carboxylate, an alkali metal carbonate or bicarbonate or any combination thereof. In another embodiment, non-limiting examples of alkali metal hydroxides comprise: lithium hydroxide, sodium hydroxide, potassium hydroxide, or a combination thereof. In another embodiment, non-limiting examples of alkali metal hydrides comprise: sodium hydride, potassium hydride, or a combination thereof. In another embodiment, non-limiting examples of alkali metal alkoxides comprise: sodium methoxide, sodium ethoxide, lithium methoxide, lithium ethoxide, sodium tert-butoxide, potassium tert-butoxide, sodium tert-pentoxide, potassium tert-pentoxide, or a combination thereof. In another embodiment, non-limiting examples of alkali metal carboxylates comprise: sodium formate, potassium formate, sodium acetate, potassium acetate, or a combination thereof. In another embodiment, non-limiting examples of alkali metal carbonates or bicarbonates comprise: sodium carbonate, sodium bicarbonate, potassium carbonate, potassium bicarbonate, or a combination thereof. In one embodiment, the organic base comprises: a primary amine, a secondary amine, an aromatic amine, a tertiary amine or any combination thereof. In another embodiment, non-limiting examples of the amines comprise: triethylamine, tributylamine, diisopropylethylamine, diethylamine, N-methylmorpholine, pyridine, 4-(N,N-dimethylamino)pyridine, N,N-dimethylaniline, N,N-diethylaniline, dicyclohexylamine, ethanolamine, diethanolamine, triethanolamine, procaine, or a combination thereof. In another embodiment, the alkali metal bicarbonate is sodium bicarbonate. In another embodiment, the alkali metal bicarbonate is aqueous or non-aqueous sodium bicarbonate. Each possibility represents a separate embodiment of the invention.

In some embodiments, a solvent is used within the methods of the present invention. In one embodiment, the solvent comprises an alcoholic solvent, an ester solvent, an ether solvent, a hydrocarbon solvent, a polar aprotic solvent, a ketone solvent, a chlorinated solvent, a nitrile solvent, a polar solvent or any combination thereof. In another embodiment, non-limiting examples of alcoholic solvents include: methanol, ethanol, n-propanol, isopropanol, n-butanol, isobutanol, or a combination thereof. In another embodiment, non-limiting examples of ester solvents include: ethyl acetate, methyl acetate, isopropyl acetate, or a combination thereof. In another embodiment, non-limiting examples of ether solvents include: tetrahydrofuran, diethyl ether, methyl tert-butyl ether, or a combination thereof. In another embodiment, non-limiting examples of hydrocarbon solvents include: toluene, hexane, heptane, cyclohexane, or a combination thereof. In another embodiment, non-limiting examples of polar aprotic solvents include: dimethyl acetamide, dimethyl formamide, dimethyl sulfoxide, or a combination thereof.

In another embodiment, non-limiting examples of ketone solvents include: acetone, methyl ethyl ketone, methyl isobutyl ketone, or a combination thereof. In another embodiment, non-limiting examples of chlorinated solvents include: methylene chloride, chloroform, ethylene dichloride, or a combination thereof. In another embodiment, non-limiting examples of nitrile solvents include: acetonitrile, propionitrile, or a combination thereof. In another embodiment, non-limiting examples of polar solvents include water. In another embodiment, the solvent is ethanol. In another embodiment, the solvent is isopropyl acetate. In another embodiment, when a solvent such as water is used for example in the basification step within the methods described hereinabove, the product (e.g. compound of Formula (I), (I-1) or Compound (1)) is isolated directly via for example filtration. In another embodiment, basification step using aqueous base (e.g. $KHCO_3$ (aq)) is done in the presence of non-aqueous solvent such as methylene chloride, and then the non-aqueous solvent is evaporated following separation thereof from the product (e.g. compound of Formula (I), (I-1) or Compound (1)). Each possibility represents a separate embodiment of the invention.

In another embodiment, the methods of the present invention include use of a catalyst. In another embodiment, a catalyst is optionally used (i.e. may or may not be used) in the chiral salt formation step (providing a compound of Formula (Ib), (Ib-1), (Iz), (Iz-1), (Ic), (Ic-1), (Id), (Id-1), (Izi), (Izi-1) or Compound (1b), (1z), (1c), (1d) or (1zi)). In another embodiment, the catalyst is an aromatic aldehyde catalyst. In another embodiment, the catalyst is benzaldehyde, salicylaldehyde, 3,5-dichlorosalicylaldehyde, p-nitrobenzaldehyde, or any combination thereof. In another embodiment, the catalyst is 3,5-dichlorosalicylaldehide. In another embodiment, 0.001 to 1.0 mole equivalents of the catalyst compared to the compound of Formula (Ia), (Ia-1) or Compound (1a) are used. In another embodiment, 0.03 mole equivalents of catalyst are used compared to the compound of Formula (Ia), (Ia-1) or Compound (1a). Each possibility represents a separate embodiment of the invention.

Without being bound by any mechanism or theory, it is contemplated that the anti-solvent and/or catalyst in the methods of the present invention provides higher yield and/or purity of the provided chiral acid salts (e.g. the compound of Formula (Iz), (Ib), (Izi), (Iz-1), (Ib-1) or Compound (1z), (1zi) or (1b)).

In another embodiment, the reactions within the methods of the present invention (e.g. salt formation step and/or basification to provide the chiral product) are conducted at a temperature of between -5-100° C. In another embodiment, the temperature range is between 60-65° C. In another embodiment, the temperature range is between 0-45° C. In another embodiment, the temperature range is between -5-45° C. In another embodiment, the temperature range is between 5-10° C. In another embodiment, the temperature range is between -5-35° C. In another embodiment, the temperature range is between 0-35° C. In another embodiment, the temperature is 60° C. In another embodiment, the temperature range is between 0-100° C. In another embodiment, the salt formation step is conducted at between -5-35° C. or between 60-65° C. In another embodiment, the basification to provide the chiral product is conducted at between 0-45° C. or 5-10° C. Each possibility represents a separate embodiment of the invention.

Compounds (1a)-(1d)

In another embodiment, the present invention provides a compound represented by the following structure:

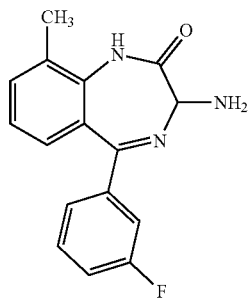

Compound (1a)

and/or any pharmaceutically acceptable salts thereof.

In another embodiment, the present invention provides a compound represented by the following structure:

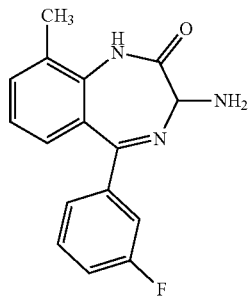

Compound (1a)

and any pharmaceutically acceptable salts thereof.

In another embodiment, the present invention provides a compound represented by the following structure:

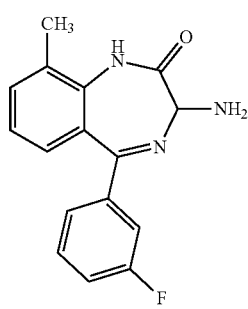

Compound (1a)

or any pharmaceutically acceptable salts thereof.

In another embodiment, the present invention provides a compound represented by the following structure:

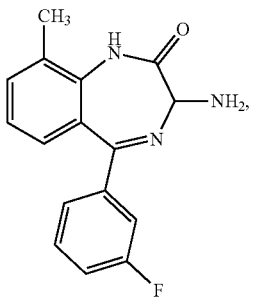

Compound (1a)

a pharmaceutically acceptable salt thereof, or a combination thereof.

In another embodiment, the present invention provides a mixture or combination comprising a) Compound (1a) in its free base form and b) Compound (1a) in its pharmaceutically acceptable salt form, wherein Compound (1a) is as described hereinabove.

In another embodiment, the present invention provides a compound represented by the structure of Compound (2):

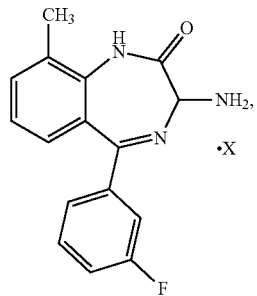

Compound (2)

wherein X comprises: chloride, acetate, adipate, alginate, ascorbate, aspartate, benzoate, benzenesulfonate, bisulfate, borate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt, or any combination thereof.

In one embodiment, a compound as described herein, which, in one embodiment, is Compound (1a), is a free base. In another embodiment, the compound is in a pharmaceutically acceptable salt form. In one embodiment, a free base comprises a compound in which the amine moiety of the compound ($NH_2$) is not protonated. In one embodiment, a pharmaceutically acceptable salt form comprises a compound in which the amine moiety of the compound ($NH_2$) is protonated, and the whole compound is positively charged. In one embodiment, a counter anion is used to balance the charges. In another embodiment, Compound (1a) is in a chloride, acetate, adipate, alginate, ascorbate, aspartate, benzoate, benzenesulfonate, bisulfate, borate, butyrate, citrate, camphorate, pyroglutamate, camphorsulfonate, cyclopentanepropionate, digluconate, dodecylsulfate, ethanesulfonate, fumarate, glucoheptanoate, glycerophosphate, hemisulfate, heptanoate, hexanoate, hydrochloride, hydrobromide, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt form, or any combination thereof. Each possibility represents a separate embodiment of the invention.

In another embodiment, the present invention provides a compound represented by the following structure:

Compound (1b)

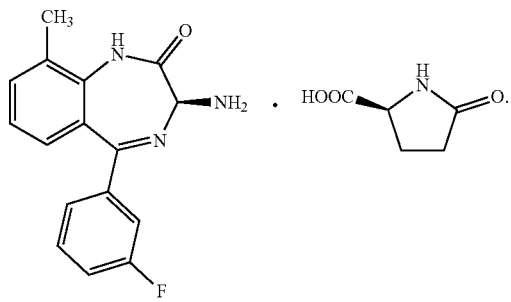

In another embodiment, the present invention provides a compound represented by the following structure:

Compound (1c)

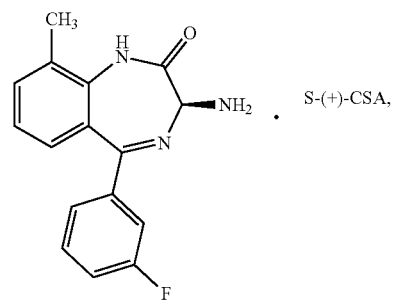

S-(+)-CSA, wherein S-(+)-camphorsulfonic acid (CSA) is

CSA

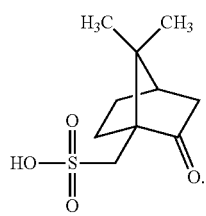

In another embodiment, the present invention provides a compound represented by the following structure:

Compound (1d)

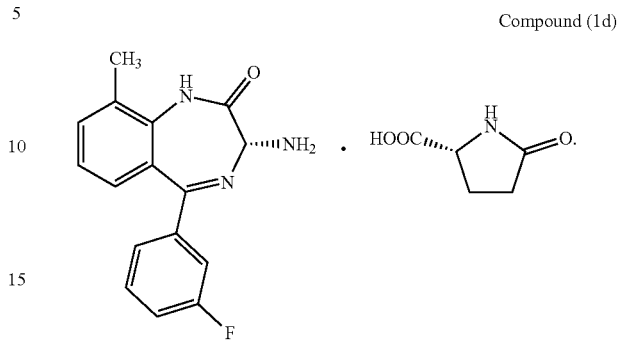

Each possibility represents a separate embodiment of the invention.

In some embodiments, the present invention provides Compounds (1a)-(1c) for use as intermediates in the preparation of (2R,3S)-N-[(3S)-5-(3-Fluorophenyl)-9-methyl-2-oxo-2,3-dihydro-1H-1,4-benzodiazepin-3-yl]-2,3-bis(3,3,3-trifluoropropyl) succinimide, presented below:

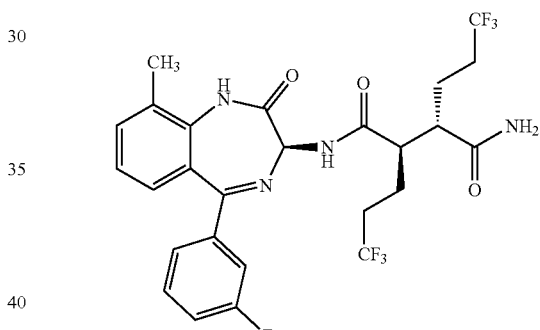

In one embodiment, the chiral Compound (1) is prepared from Compounds (1a)-(1c), using the methods of the present invention, as detailed below in "Method of Preparing Compound of Formula (I) and Salts thereof."

Compound (1)

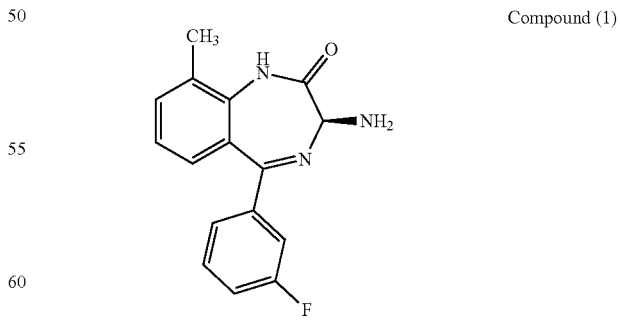

In one embodiment, the chiral Compound (2) is prepared from Compounds (1a)-(1c), using the methods of the present invention, as detailed below in "Method of Preparing Compound of Formula (I) and Salts thereof."

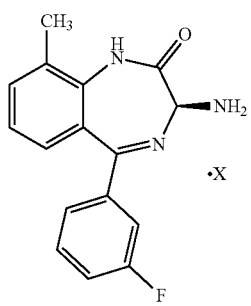

Compound (2)

The preparation of (2R,3S)-N-[(3S)-5-(3-Fluorophenyl)-9-methyl-2-oxo-2,3-dihydro-1H-1,4-benzodiazepin-3-yl]-2,3-bis(3,3,3-trifluoropropyl) succinimide from Compound (1) is further detailed in U.S. Pat. No. 9,273,014, incorporated herein by reference in its entirety.

Definitions

In some embodiments, each $R^1$ is independently F, Cl, Br, I, $OCH_3$, CN or $NO_2$. In one embodiment, when $n^1$ is greater than 1, each $R^1$ is identical or different. Each possibility represents a separate embodiment of the invention.

In some embodiments, each $R^2$ is independently $C_1$-$C_5$ alkyl. In one embodiment, the term "alkyl" refers to either branched and straight chain saturated aliphatic hydrocarbon groups containing, for example, from 1 to 12 carbon atoms, from 1 to 6 carbon atoms, and from 1 to 5 carbon atoms. Examples of alkyl groups include, but are not limited to, methyl (Me), ethyl (Et), propyl (e.g., n-propyl and i-propyl), butyl (e.g., n-butyl, i-butyl, sec-butyl, and t-butyl), and pentyl (e.g., n-pentyl, isopentyl, neopentyl), n-hexyl, 2-methylpentyl, 2-ethylbutyl, 3-methylpentyl, and 4-methylpentyl. When numbers appear in a subscript after the symbol "C", the subscript defines with more specificity the number of carbon atoms that a particular group may contain. For example, "$C_{1-5}$ alkyl" denotes straight and branched chain alkyl groups with one to five carbon atoms. Each possibility represents a separate embodiment of the invention.

In some embodiments, $n^1$ is an integer between 1 and 5. In one embodiment, $n^1$ is 1, 2,3, 4 or 5. Each possibility represents a separate embodiment of the invention.

In some embodiments, $n^2$ is an integer between 1 and 4. In one embodiment, $n^1$ is 1, 2,3 or 4. Each possibility represents a separate embodiment of the invention.

The term "reacting" within the context of the present invention is defined as provision of one or more conditions (e.g. heating, refluxing) which are sufficient for reactants to react chemically.

In some embodiments, when the following moiety is found within a compound as described hereinabove (e.g. compounds represented by the structures of Formulas (Ib), (Id), (Ib-1), (Id-1) and Compounds (1b) and (1d)):

It is to be understood that at least part of the moiety can be represented by the following ion pair structure:

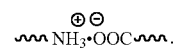

In some embodiments, when the following moiety is found within a compound as described hereinabove (e.g. compounds represented by the structures of Formulas (Ic), (Ic-1) and Compound (1c)):

It is to be understood that at least part of the moiety can be represented by the following ion pair structure:

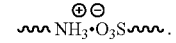

In one embodiment, all (or almost all, e.g. above 99%) of the amine is protonated and all (or almost all, e.g. above 99%) of the carboxylic acid/sulfonic acid is deprotonated within the above structure/embodiment. In some embodiments, the notation "⌇" means "any moiety".

The following examples are presented in order to more fully illustrate the preferred embodiments of the invention. They should in no way, however, be construed as limiting the broad scope of the invention.

EXAMPLES

Example 1

Synthesis of Compound (1)-Method A

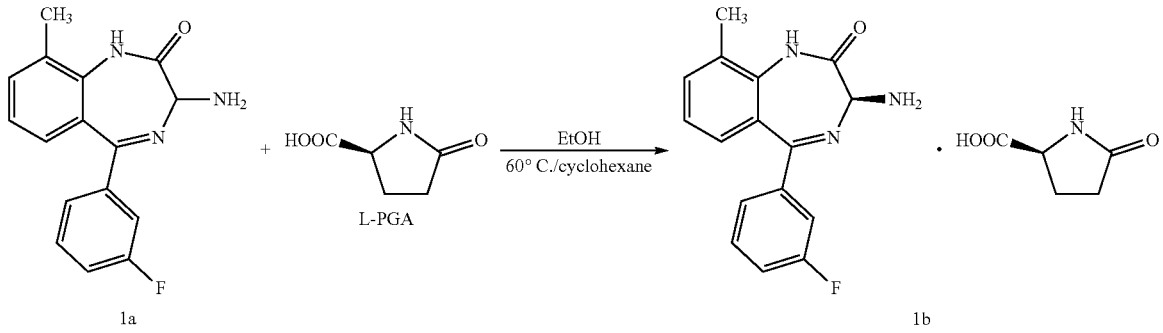

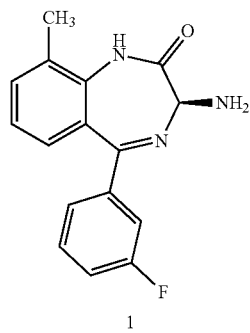

1

Compound (1a) (0.5 g, 1.0 eq; see synthesis thereof below) was dissolved in EtOH (10 mL, vol) and stirred for 10 min at 25-35° C. L-pyroglutamic acid or(S)-(−)-2-Pyrrolidone-5-carboxylic acid (0.23 g, 1.0 eq) was added (clear solution followed by solid precipitation was observed at 25-35° C.), and the contents were heated to 60-65° C., stirred for 1.0 h and subsequently cooled to 25-35° C. Cyclohexane (20 mL, 40 vol) was then added, the solid precipitate was filtered and washed with cyclohexane (5 mL, 10 vol), and the washed solid was dried at 45° C. to obtain Compound (1b) (0.5 g; 68.4% yield from (1a)). The chiral HPLC purity of Compound (1b) was 99.4% and of the other isomer was 0.6% (FIG. 1). The chiral purity was measured using HPLC with: column of ChiralPack OJ-RH (50×4.6 mm, 5□), mobile phase of 10 mM ammonium acetate in water: acetonitrile (80:20), pH 7.5 adjusted with ammonium hydroxide, methanol diluent, 1.2 ml/minute flow and isocratic gradient. Retention time of Compound (1b) was 9.54 minutes under these conditions. When 0.5 g of Compound (1a) were used, 0.5 g of Compound (1b) were obtained; when 2 g of Compound (1a) were used, 1.72 g of Compound (1b) were obtained; and when 5 g of Compound (1a) were used, 4.5 g of Compound (1b) were obtained.

0.5 gr Compound (1b) was dissolved in water (5 mL, 10 vol), and the pH was adjusted to 8.0-8.5 with 10% $NaHCO_3$ solution at 25-35° C. The aqueous layer was extracted with EtOAc (270 mL). The combined organic layers were dried over $Na_2SO_4$, filtered, and the organic layer was distilled-off under vacuum at 30-35° C. To the dried organic layer cyclohexane was added (5 mL, 10 vol), and the resulting solution was stirred for 12 h. The resulting precipitate was filtered and washed with cyclohexane (2.5 mL, 5.0 vol) and subsequently dried at 50-55° C. for 16 h to get 0.2g of Compound (1) as the S isomer of Compound (1a). When 0.2 g of Compound (1b) were used, 0.13 g of Compound (1) were obtained.

The resolution of Compound (1a) using Pyroglutamic acid in ethanol provided an excellent separation of R & S isomers due to the difference in solubility of the diastereomeric salts formed. The S-isomer of Compound (1a), i.e. Compound (1)—was isolated with >99.4% chiral purity after treatment of the diastereomeric salt of the S-isomer with aqueous $NaHCO_3$.

Example 2

Synthesis of Compound (1d)

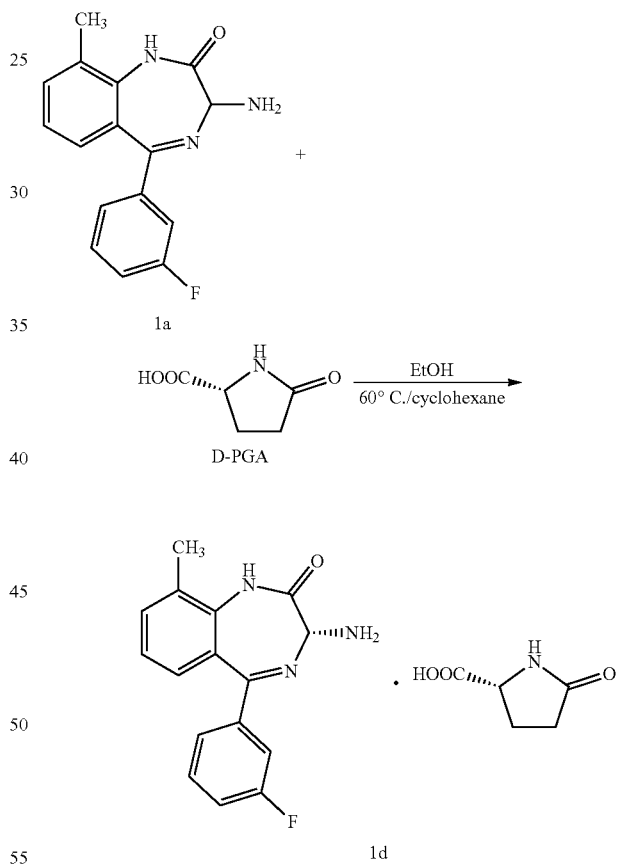

Compound (1a) (500 mg, 1.0 eq.) was dissolved in EtOH (10 ml), stirred for 10 min. Next, D-pyroglutamic acid (D-PGA; 0.228 gr, 1.0 eq) was added, and the contents were heated to 60-65° C. and then stirred for 1.0 hr, followed by cooling to 25-35° C. Cyclohexane (20 mL) was subsequently added, and the resulting mixture was stirred for 1.0 h at 25-35° C. and filtered. The obtained solid was washed with cyclohexane and dried at 50-55° C. to get Compound (1d) at a yield of 0.43 gr/59.1%.

Example 3

Non-PGA Salts Did Not Resolve Compound (1a)

L-Aspartic acid, L-Leucine, S-Mandelic acid, N-Acetyl-L-Tyrosine, N-Acetyl-L-Valine, S(+) CSA (camphor sulfonic acid) and L-Glutamic acid were used in similar manner as L-PGA was used in Method A of Example 1. L-Aspartic acid, L-Leucine and N-acetyl-L-Tyrosine did not form a salt with Compound (1a). N-Acetyl-L-Valine, S (+) CSA and L-Glutamic acid salt formation was observed with Compound (1a) but no resolution (50:50 mix. of R: S isomers) was observed by chiral HPLC after isolation of salt.

Example 4

Synthesis of Compound (1c)

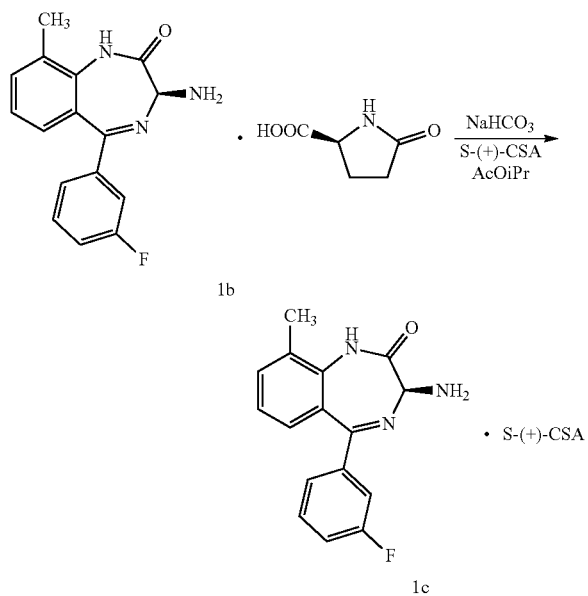

Figure 2:
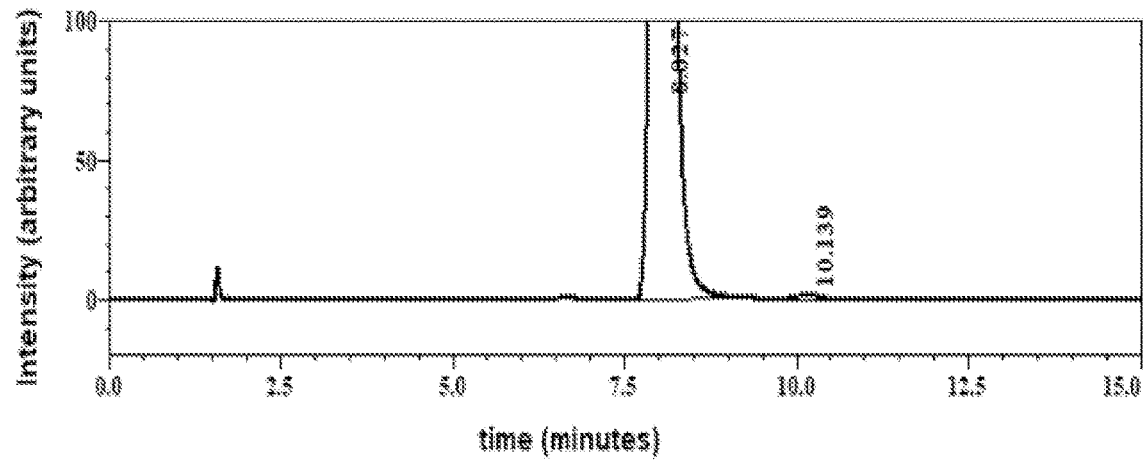
FIG. 2 depicts an HPLC chromatogram, showing the chiral purity of Compound (1c).

1.0 gr (1.0 eq.) of Compound (1b) was dissolved in water (10 vol), and the pH was adjusted to 8.0-8.5 with 5% $NaHCO_3$ solution (0.5 gr, 0.5 w/w % 10 vol) at 25-35° C. The mixture was stirred for 30 min. AcOiPr (40 ml) was added, and the resulting mixture was stirred for 30 min followed by separation of both layers. The aqueous layer was extracted with AcOiPr (15 ml). The combined organic layers were dried over $NaSO_4$ (2.0 g), filtered and washed with AcOiPr (5 ml), and then the filtrate was dissolved into Round Bottom Flask (RBF). S-CSA (0.56 gr/1.0 eq.) was added into RBF, and the resulting mixture was stirred for 4 h. The resultant solid was filtered, and the compound was washed with AcOiPr (5.0 ml) and dried at 60-65° C. for 16 h. The yield of Compound (1c) was 0.95 gr/60.8%, and chiral purity was 99.88%. When upscaling the reaction by a factor of five (i.e. employing 5.0 eq. (5.0 gr) of Compound (1b) and using corresponding amounts of other reagents/solvents)—a 75% yield of Compound (1c) was achieved, having an HPLC chiral purity of 99.64% (FIG. 2). Chiral purity was measured using HPLC, with: column of Chiral-Pack OJ-RH (50×4.6 mm, 5□), mobile phase of 10 mM ammonium acetate in water: acetonitrile (80:20), pH 7.5 adjusted with ammonium hydroxide, methanol diluent, 1.0 ml/minute flow and isocratic gradient. Retention time of Compound (1c) was 8.03 minutes under these conditions.

Example 5

Synthesis of Compound (1)-Method B(cyclohexane addition)

Example 1 was repeated using a modified procedure for preparing Compound (1b): 2.0 gr Compound (1a) (1.0 eq.) was dissolved in EtOH (10 ml), and the solution was stirred for 10 min. Then, L-pyroglutamic acid (0.91 gr, 1.0 eq) was added, and the contents were heated to 60-65° C. and stirred for 8.0 hr, followed by cooling to 25-35° C. Cyclohexane (80 ml) was then added, and the resulting mixture was stirred for 12 h at 25-35° C. and filtered. The obtained solid was washed with cyclohexane (80 ml) and dried at 50-55° C. to produce Compound (1b) at a yield of 1.72 gr/59.1%. Compound (1) was prepared from Compound (1b) as in Example 1.

Example 6

Synthesis of Compound (1)-Method C (3,5-dichlorosalicylaldehyde addition)

Example 1 was repeated using a modified procedure for the preparation of Compound (1b)

2.0 gr Compound (1a) (1.0 eq.) was dissolved in EtOH (40 ml), and the solution was stirred for 10 min. Then, L-pyroglutamic acid (0.91 gr, 1.0 eq) was added, and the contents were heated to 60-65° C. and stirred for 4.0 hr. Then 3,5-Dichoro salicylaldehyde (0.03 eq) was added, and the contents were maintained for 4.0 hr at 60-65° C. followed by cooling to 25-35° C. Cyclohexane (80 ml) was then added. The resulting mixture was stirred for 12 h at 25-35° C. and filtered. The obtained solid was washed with cyclohexane (80 ml) and dried at 50-55° C. to produce Compound (1b) at a yield of 2.38 gr/79.9%. Compound (1) was prepared from Compound (1b) as in Example 1.

Example 7

Synthesis of Compound (1a)

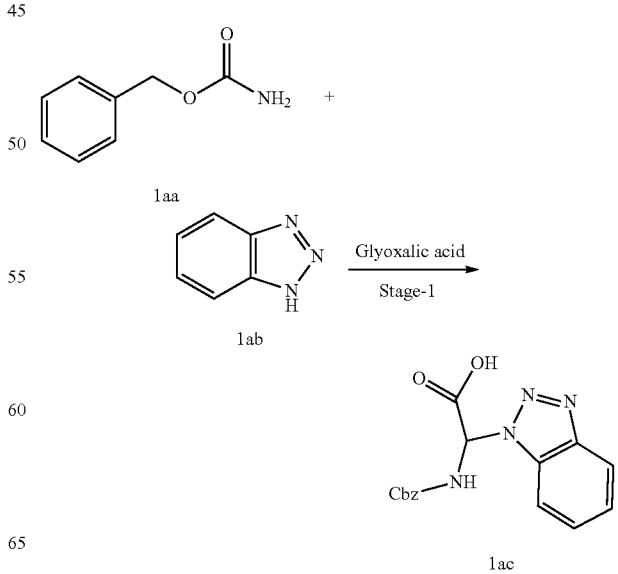

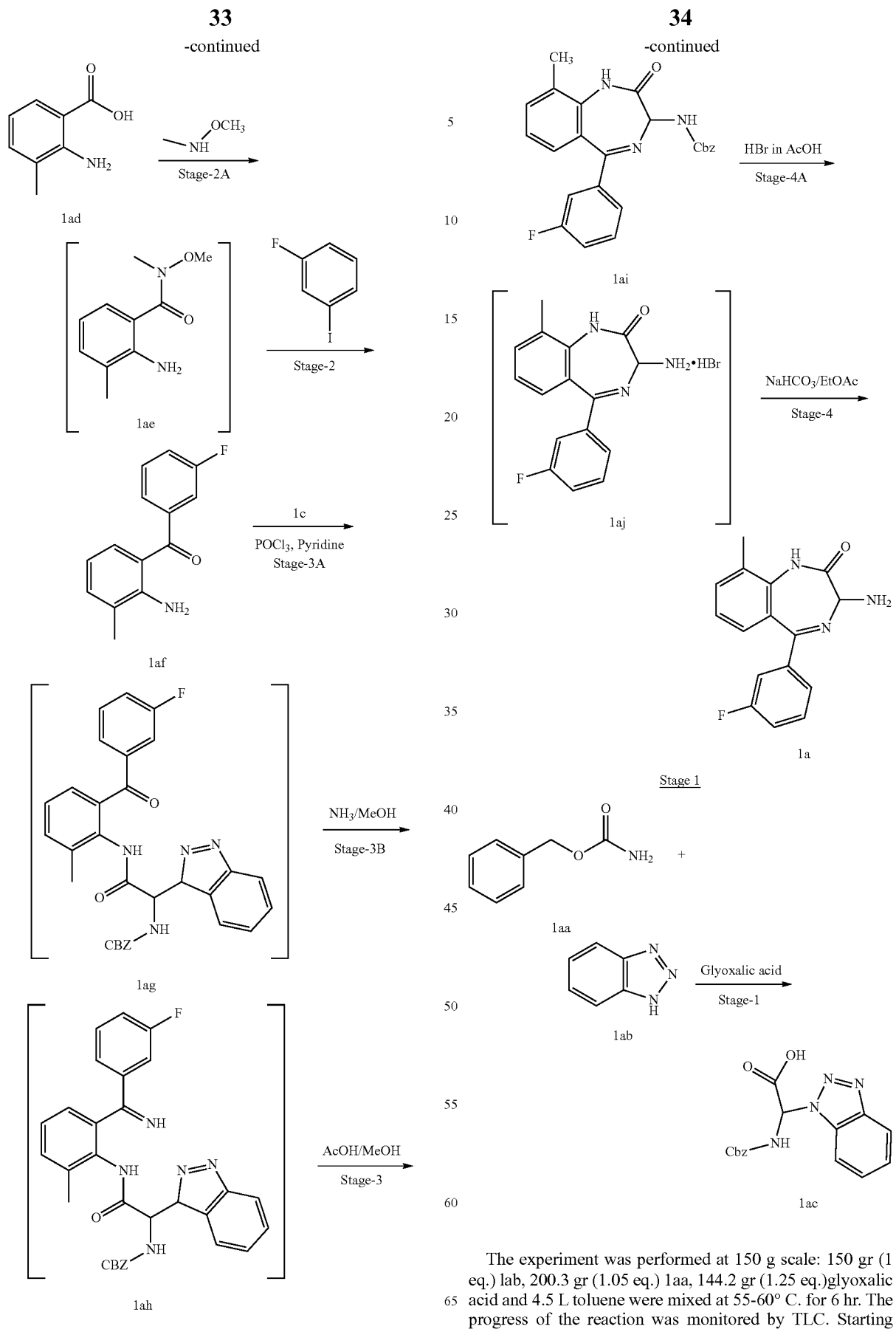
The experiment was performed at 150 g scale: 150 gr (1 eq.) lab, 200.3 gr (1.05 eq.) 1aa, 144.2 gr (1.25 eq.) glyoxalic acid and 4.5 L toluene were mixed at 55-60° C. for 6 hr. The progress of the reaction was monitored by TLC. Starting material was present around 2-3% after 4 hrs. After the reaction was completed, the mixture was cooled to 25-30° C., and purified water (10 vol) was added. The resulting mixture was stirred for 1.0 hr, and the contents were filtered. The obtained slurry was washed with water (15 vol) followed by a toluene (5 vol) & MTBE (10 vol) wash. Subsequently, the slurry was dried in a vacuum oven at 70-75° C., with a yield of 375 gr/91.3% with purity of 97.11% (HPLC).

Stage 2A

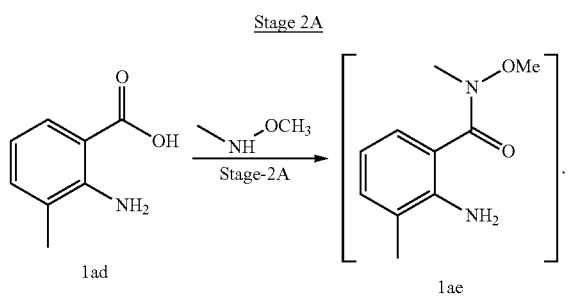

The experiment was performed at 10 g scale: 10 gr (1 eq.) 1ad, 12.9 gr (2.0 eq.) methoxymethylamine, 23.3 gr (1.1 eq.) TBTU, 40.1 ml (3.4 eq.) DIPEA and 100 ml THF were mixed at 25-35° C. for 8 hr. Progress of the reaction was monitored by TLC and starting material was present ~ below 1.0% after 8 hrs. After completion of the reaction, 10% aq NaHCO₃ solution (10 vol) were added, the mixture was stirred for 30 min, then isopropyl acetate (10 vol) was added and the resulting mixture was stirred for 30 min. Both layers were separated. The organic layer was washed with 10% aq NaHCO₃ solution (2×5 vol), water (5 vol) and brine solution (5 vol) and then it was dried over Na₂SO₄, filtered and concentrated under vacuum to get compound which was confirmed by HNMR and mass. Yield was 13.1 gr.

Stage 2

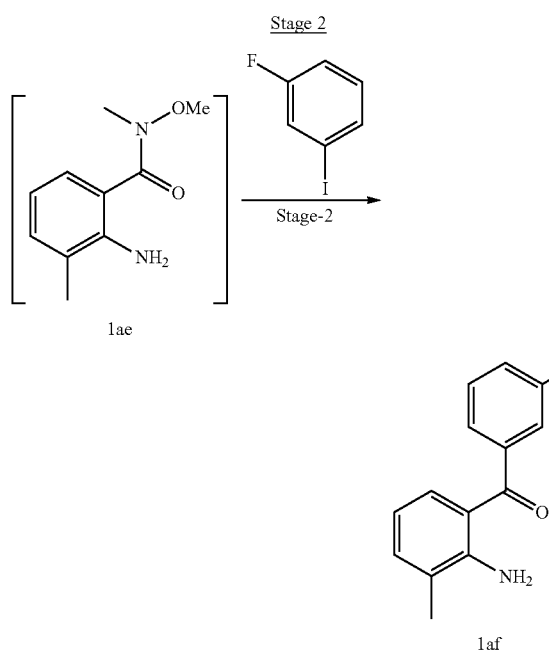

The experiment was performed at 13 g scale: 13 gr (1 eq.) 1ae, 51.9 gr (3.5 eq.) 3-fluoro-1-iodo-benzene, 93.5 ml (3.5 eq.) 2.5M n-BuLi, 104 ml THF were mixed at (−78)-(−73° C.) for 1 hr. Progress of the reaction was monitored by TLC and starting material was present ~ below 1.0% after 1 hr. After completion of the reaction, 20% aq Ammonium chloride (13 vol) were added, the mixture was stirred for 30 min and then ethyl acetate (7 vol) was added and the resulting mixture was stirred for 30 min. Both layers were separated. The organic layer was washed with saturated brine solution (5 vol), dried over Na₂SO₄, filtered and concentrated under vacuum to get crude compound which was confirmed by 1H NMR and mass spectrometry. Yield was 9.5 gr/53.7%.

Stage 3A

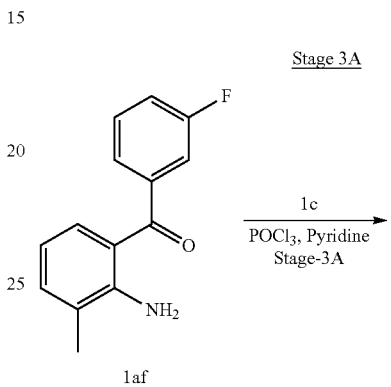

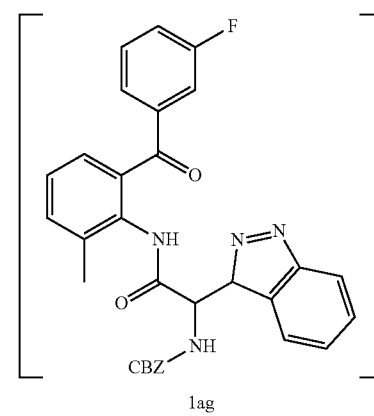

The experiment was performed at 9 g scale: 9 gr (1 eq.) 1af, 13.2 gr (1.2 eq.) 1c, 6.2 gr (1.2 eq.) POCl₃, 18 ml (2.0 eq.)pyridine and 45 ml THF were mixed at (−345)-(−30° C.) for 0.25 hr, then at 0-15° C. for 1 hr. After completion of the reaction, the reaction mass was quenched with ice cold water (5 vol), stirred for 30 min, then Ethyl acetate (10 vol) was added and resulting mixture was stirred for 30 min. Both layers were separated. The organic layer was washed with 1N HCl solution (10 vol), water (10 vol), 10% sodium bicarbonate solution (10 vol), water (10 vol), and saturated brine solution (4 vol) and then the resulting mixture was dried over Na₂SO₄, filtered and concentrated under vacuum. Subsequently, IPA (5 vol) was added to get the compound, which was confirmed by 1HNMR and Mass. Yield was 16 gr/88%.

Stage 3B and 3

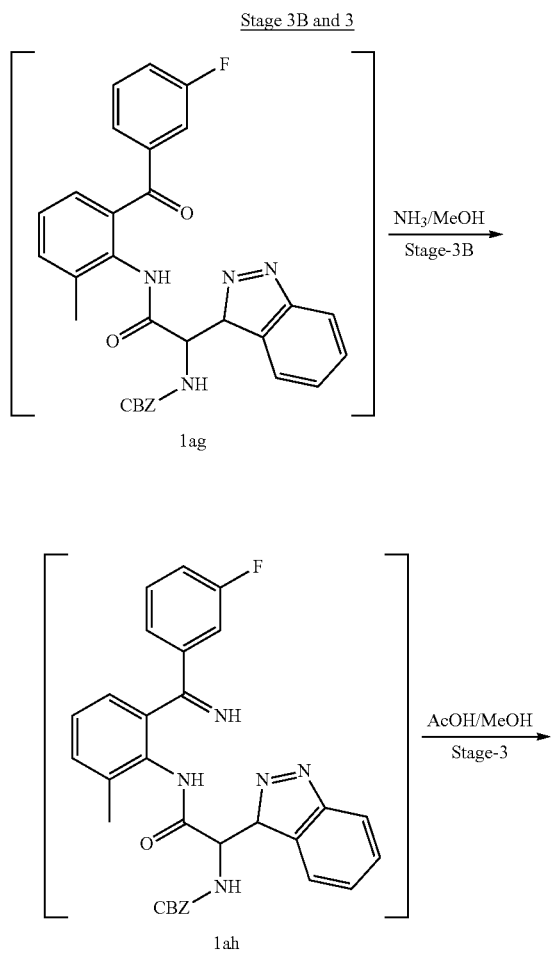

Stage 4A

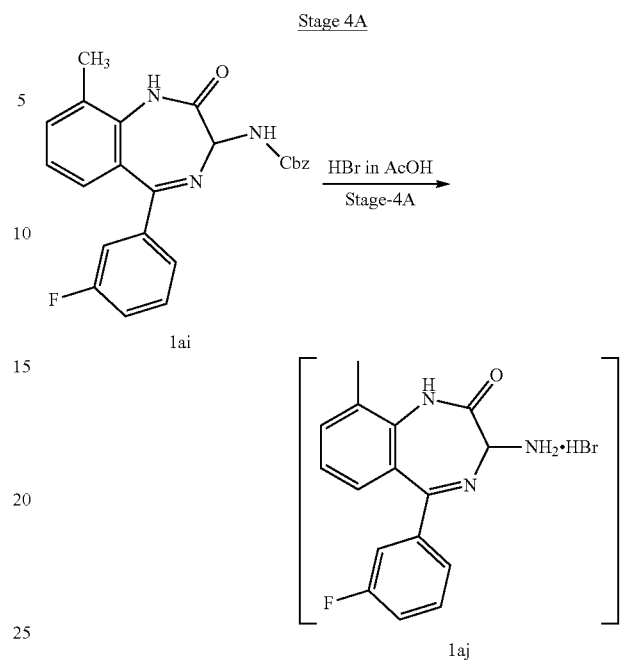

The Experiment was performed at 7 g scale: 7 gr (1 eq.) Compound (1ai), 35 ml (5 vol) HBr in AcOH, and 175 ml MTBE were mixed at 25-35° C. for 1-2 hrs. Progress of the reaction was monitored by TLC and the starting material was absent after 1 hr. After completion of the reaction, MTBE (15.0 vol) was added, the mixture was stirred for 2 h, the contents were filtered and the slurry was washed with MTBE (10 vol), vacuum dried for 1 hr and dried at 45-50° C. to get Compound (1aj) at yield of 6.0 gr/98%.

Stage 4

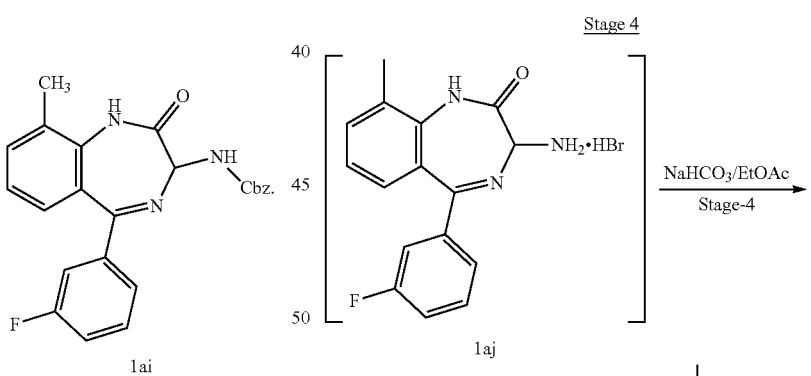

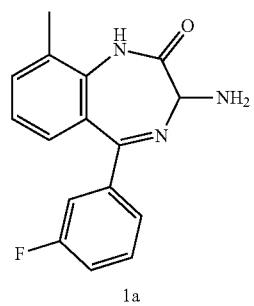

The experiment was performed at 15 g scale of lag. NH₃ gas purging in Methanol (6.0 vol) for 1 h at 0-5° C. and after the ammonia gas purging reaction, resulting mixture was distilled of the solvent upto 4.0 vol and 5-6 vol Methanol were added and co-distilled upto 3-4 vol. Acetic acid (4.0 vol) was added to the organic layer and the solution was stirred for 16 h at 25-30° C. Following reaction completion, solvent was distilled up to 4.0 vol and the mixture was cooled to 25-30° C. and then IPA (6.0 vol) and water (6.0 vol) were added, followed by filtration of the solid which was washed with a mixture of IPA (6.0 vol) and purified water (10.0 vol). The product was analyzed and the yield was 7.5 gr/53%.

The experiment was performed at 90 g scale of 1aj. Compound (1aj) was dissolved in water (10 vol) and the pH was adjusted to 8.0-8.5 with 10% NaHCO₃ solution (5.0 vol)

at 25-35° C. After pH adjustment a heterogenous mixture was observed. The contents were stirred for 2.0 h at 25-35° C., filtered and washed with purified water (5.0 vol) and suck dried under vacuum. The wet material was extracted with EtOAc (1.0 vol) at 25-35° C. for 30 min and the compound was filtered and washed with EtOAc (1.0 vol) and dried at 50-55° C. for 16h. Yield was 52 gr/85.2%.

Example 8

A Dynamic Kinetic Resolution Study of Compound (1a)

Compound (1a) is converted to the S isomer (Compound (1)) in one step (with high yield and high chiral purity) using catalytic amounts of benzaldehyde, salicylaldehyde, 3,5-dichlorosalicylaldehyde or p-nitrobenzaldehyde and a solvent such as cyclohexane/EtOH or other appropriate solvent system.

What is claimed is:

1. A method of preparing the compound of Formula (Ib) or (Id),

Formula (Ib)

Formula (Id)

wherein $R^1$ each is independently Cl, F, Br, I, OCH$_3$, CN or NO$_2$;

$R^2$ each is independently identical or different C$_1$-C$_5$ alkyl;

$n^1$ is an integer between 1 and 5; and $n^2$ is an integer between 1 and 4;

comprising the step of: reacting the compound of Formula (Ia)

Formula (Ia)

with L or D-pyroglutamic acid (L-PGA), respectively:

L-pyroglutamic acid (L-PGA) or D-pyroglutamic acid (D-PGA);

in the presence of solvent and with or without catalyst to obtain a compound of Formula (Ib) or (Id).

2. The method according to claim 1, wherein the compound of Formula (Ia) is represented by Compound (1a) and the compound of Formula (Ib) is represented by Compound (1b) or the compound of Formula (Id) is represented by Compound (1d):

Compound (1a)

Compound (1b)

-continued

Compound (1d)

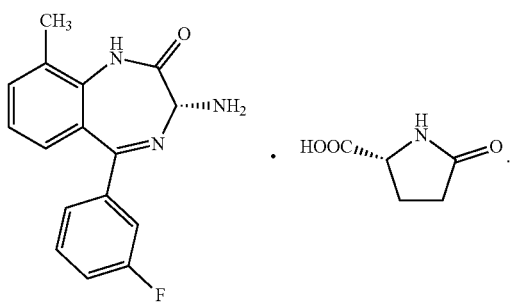

3. The method according to claim 1, wherein the yield of the compound of Formula (Ib) or Formula (Id) is greater than 50%.

4. The method according to claim 1, wherein the catalyst comprises benzaldehyde, salicylaldehyde, 3,5-dichlorosalicylaldehyde, p-nitrobenzaldehyde or any combination thereof.

5. The method according to claim 4, wherein the catalyst comprises 3,5-dichlorosalicylaldehyde.

6. The method according to claim 1, wherein 0.001 to 1.0 mole equivalents of the catalyst compared to the compound of Formula (Ia) are used.

7. The method according to claim 6, wherein 0.03 mole equivalents of the catalyst compared to the compound of Formula (Ia) are used.

8. The method according to claim 1, wherein the reaction is conducted at a temperature between 0-100° C.

9. A method of preparing the compound of Formula (Ic),

Formula (Ic)

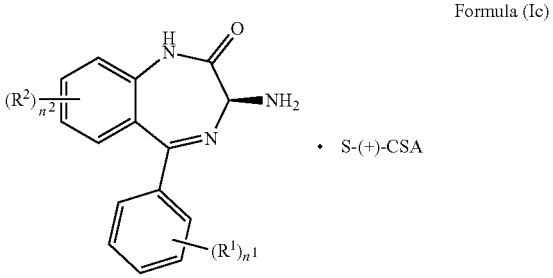

comprising the steps of:
a) reacting the compound of Formula (Ib):

Formula (Ib)

with a base and solvent to provide a compound of Formula (I); and

Formula (I)

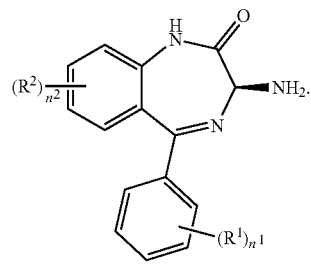

b) reacting the compound of Formula (I) with S (+) camphor sulfonic acid (CSA):

to provide a compound of Formula (Ic),
wherein
$R^1$ each is independently Cl, F, Br, I, $OCH_3$, CN or $NO_2$;
$R^2$ each is independently identical or different $C_1$-$C_5$ alkyl;
$n^1$ is an integer between 1 and 5; and
$n^2$ is an integer between 1 and 4.

10. The method according to claim 9, wherein the compound of Formula (I) is represented by Compound (1); the compound of Formula (Ib) is represented by Compound (1b); and the compound of Formula (Ic) is represented by Compound (1c):

Compound (1)

Compound (1b)

; and

-continued

Compound (1c)

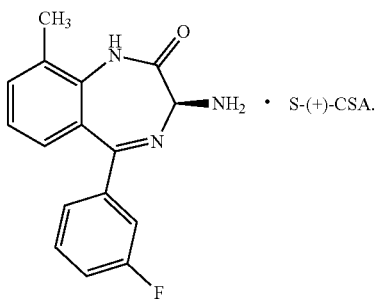

S-(+)-CSA.

11. The method according to claim 9, wherein the base comprises an inorganic base, an organic base, or any combination thereof.

12. The method according to claim 11, wherein the inorganic base comprises: an alkali metal hydroxide; an alkali metal hydride; an alkali metal alkoxide; an alkali metal carboxylate; an alkali metal carbonate, bicarbonate, or any combination thereof.

13. The method according to claim 12, wherein the alkali metal carbonate is sodium bicarbonate.

14. The method according to claim 11, wherein the organic base comprises: a primary amine, a secondary amine, an aromatic amine, a tertiary amine, or any combination thereof.

15. The method according to claim 9, wherein the solvent comprises an alcoholic solvent; an ester solvent; an ether solvent; an hydrocarbon solvent; a polar aprotic solvent; a ketone solvent; a chloro solvent; a nitrile solvent; a polar solvent; or any combination thereof.

16. The method according to claim 15, wherein the ester solvent is isopropyl acetate.

17. The method according to claim 9, wherein the reaction of step (a) is conducted at a temperature between 0-45° C.

18. The method according to claim 17, wherein the temperature range is between 5-10° C.

19. The method according to claim 1, wherein the chiral purity of the compound of Formula (Ib) or (Id) is greater than 99%.

20. The method according to claim 19, wherein the chiral purity is greater than 99.5%.

21. A compound represented by the following structure

Compound (2)

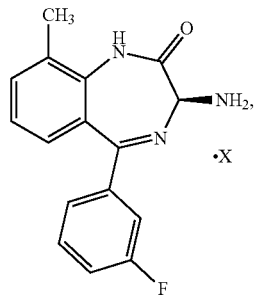

·X wherein X comprises: chloride, acetate, adipate, alginate, ascorbate, aspartate, benzoate, benzenesulfonate, bisulfate, borate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydroiodide, maleate, 2-hydroxyethanesulfonate, lactate, methanesulfonate, 2-naphthalenesulfonate, nicotinate, nitrate, oxalate, pectinate, persulfate, 3-phenylpropionate, phosphate, picrate, pivalate, propionate, salicylate, succinate, sulfate, sulfonate, tartrate, thiocyanate, toluenesulfonate, or undecanoate salt, or any combination thereof.

* * * * *